April 7, 1959 B. F. LOGAN, JR 2,881,379
VELOCITY SERVOSYSTEM WITH SIGNAL QUADRATURE COMPONENT SUPPRESSION
Filed July 26, 1955
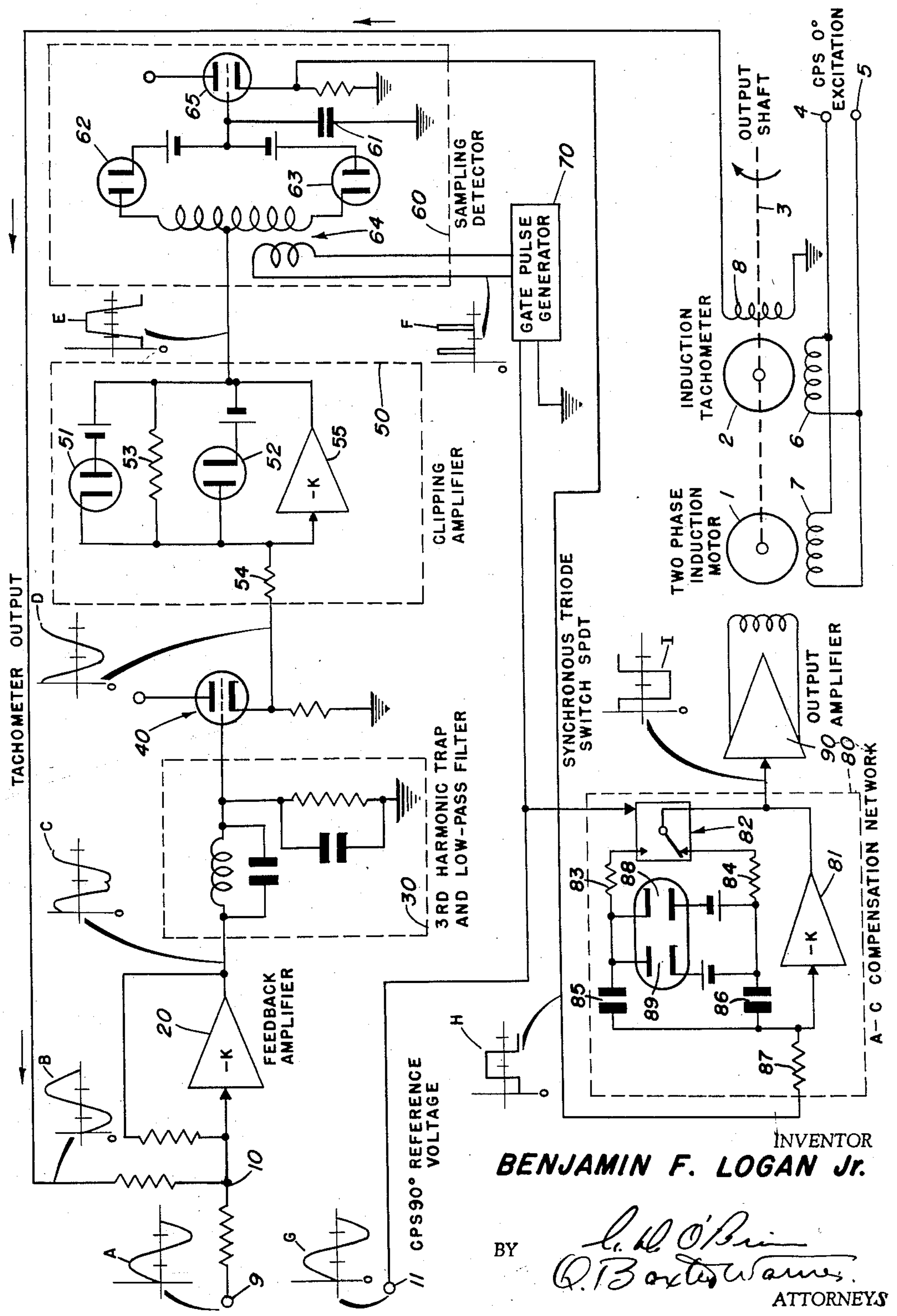
INVENTOR
BENJAMIN F. LOGAN Jr.
BY [signature]
ATTORNEYS United States Patent Office 2,881,379

Patented Apr. 7, 1959

2,881,379

VELOCITY SERVOSYSTEM WITH SIGNAL QUADRATURE COMPONENT SUPPRESSION

Benjamin F. Logan, Jr., Cambridge, Mass., assignor, by mesne assignments, to the United States of America as represented by the Secretary of the Navy Application July 26, 1955, Serial No. 524,625

10 Claims. (Cl. 318—328)

The present invention relates to a feedback network for an A.C. (alternating current) servo amplifier and more particularly to a feedback network having a sampling detector.

In the past in order to compensate A.C. servo systems, it was sometimes desirable to demodulate the error signal and use passive networks to achieve the desired compensation. The signal was then remodulated and amplified and fed to the servo motor.

One circuit that has been extensively used to achieve demodulation is the "synchronous demodulator." This circuit employs dual triodes whose grids are controlled by a reference voltage. The phase angle of the reference voltage is usually chosen to represent 0° and the phases of other signals in the system are measured with respect to it. This type of phase sensitive demodulator has many advantages which make it a desirable circuit for use in servo work.

However, it is necessary to analyze signals having voltages proportional to the error in-phase voltage and also including a quadrature voltage that is not a function of error and is 90° out of phase with the error in-phase voltage. To detect signals which have a large quadrature to in-phase ratio, of the order of 100 to 1 for example, and the maximum signal voltage (in-phase) which it is desired to detect is of the order of 10 volts, the input circuits, in order to faithfully reproduce the in-phase signal must be capable of handling linearly voltages of the order of 1000 volts. If the input amplifiers cannot handle such large voltages linearly, they will saturate when large quadrature signals are present, and will recover from this saturated condition very slowly. To build circuits of such wide dynamic range on the other hand requires a large amount of expensive circuitry.

It is not feasible to clip the input signal to a conventional synchronous demodulator since this would reduce the desired in-phase signal by the same amount as the quadrature signal because of the nature of the demodulation process.

An additional undesirable characteristic of the synchronous demodulator is that voltage in quadrature with the desired signal at the input appears as second hrrmonic voltage at the output mixed with the desired direct voltage signal. This output voltage must be filtered rather heavily to remove the second harmonic components.

Accordingly, an object of the present invention is to permit quadrature clipping without reducing the amplification of the in-phase error.

Another object is the ability to provide high gain amplification in the presence of an error signal without saturation of the amplifier thus overcoming one of the disadvantages in the use of a synchronous demodulator.

A further object is the production of a clean output waveform without the necessity of heavy filtering to remove any ripple.

Other objects and many of the attendant advantages of this invention will be readily appreciated as the same becomes better understood by reference to the following detailed description when considered in connection with the accompanying drawings wherein:

The single figure shows a schematic diagram of a preferred embodiment of the apparatus of the invention.

Referring now to the single figure, there is shown schematicaly an A.C. servo system having a two-phase induction servo motor 1, an induction tachometer 2, a feedback amplifier 20, a third harmonic and low-pass filter 30, cathode follower 40, clipping amplifier 50, sampling detector 60, gate pulse generator 70, an A.C. compensation network 80 and an output amplifier 90.

The drawing shows diagrammatically a two-phase induction motor 1 energized by an excitation voltage of zero phase degrees applied to terminals 4 and 5 and controlled by the output of the output amplifier 90 which is subjected to the in-phase error. An induction tachometer 2 is coupled to the output shaft 3 and in tachometer 2 the excitation voltage of a constant alternating frequency is applied to one winding 6 through terminals 4 and 5, thereby producing a voltage in the other winding 8 proportional to the speed of rotation of the output shaft 3. The excitation voltage may have a frequency of 416.7 cycles per second.

The command voltage waveform A represents a certain speed command to the induction motor. The output of the tachometer is indicated by waveform B which is represented by two curves. One of these curves $b_1$ represents a voltage which is a function of the shaft speed. The other curve $b_2$ represents a voltage 90° out of phase with the shaft speed. The out-of-phase signal or quadrature is small in comparison with the voltage $b_1$ representing the shaft speed. The cancellation of the command voltage by the shaft speed voltage at summing point would indicate that the output shaft speed is the same as the input command voltage. However, in case the input command waveform A and the output shaft speed, curve $b_1$, are not the same, there would exist a small in-phase component which represents the error therebetween. When the tachometer output voltage is summed at summing point 10 with the input command voltage, the quadrature component present in the output voltage of the tachometer would be large in comparison with the small in-phase component this ratio being of the order of 100 to 1. The in-phase and quadrature voltages are applied to the first stage of gain, at amplifier 20. There is no objectionable saturating effect found here since very little voltage is required at the first stage to turn the motor at top speed.

After amplification in the first stage at feedback amplifier 20, the waveform C shows the output to be a small in-phase error signal $e$ affected by harmonics and a large quadrature signal $b_2$.

The existence of harmonics in the input command speed and output shaft speed voltages A and $b_1$ are exaggerated by the near cancellation of these voltages. These harmonics are particularly encountered where iron core magnetic circuits are involved as in the induction tachometer 2.

However, any phase-sensitive detector will respond to odd harmonics in the input as if they were in-phase components of the fundamental frequency, the response depending upon the magnitude and phase of the odd harmonics. It is good engineering practice to guard against these false responses by filtering ahead of the detector. Generally, the third harmonic is predominant and it is this reason that the third harmonic trap and low-pass filter 30 precedes the sampling detector.

After trapping out the third harmonic present in the signal in the third harmonic trap and low-pass filter 30 the output of which is applied to the cathode follower 40, the total error signal as shown by waveform D is applied to the clipping amplifier 50.

To amplify the waveform D to such an extent that the in-phase component or error signal $e$ is at a suitable level for sampling requires an amplifier which will be linear over the range of in-phase components of the input voltage and yet not be overloaded by the large quadrature component. Such is the purpose and accomplishment of the feedback clipping amplifier 50. For small signals, such as the in-phase error component, the gain is extremely linear by virtue of the feedback resistor 53 connected from the output to the junction of the input resistor 54 and the grid of the high-gain amplifier 55 having a gain at the carrier frequency from grid to output of $-K$, where K is understood to be greater than unity and the minus sign indicates a phase reversal. Now for larger signals of either polarity, one or the other biased diodes 51 and 52 is made to conduct and the feedback resistor 53 is shunted by the low impedance of the conducting diode. This results in a drastic reduction in gain for these large signals such that the amplifier 55 is not overloaded and symmetry is preserved in the output waveform E. This symmetry is essential so that samples at 90° and 270° of the waveform E represent the peaks of the amplified in-phase error voltage $e$.

The clipping level is set by means of the voltage bias on diodes 51 and 52 at the minimum level consistent with the requirement that the clipper must pass error signal steps capable of reversing the torque of the servo motor when the motor field is saturated. The output of the clipping amplifier as indicated by the waveform E is fed to the sampling detector 60.

The sampling is done in detector 60 by charging a small condenser 61 to the error voltage or in-phase error component through a diode switch consisting of the detector primary of coupling 64, and two biased diodes 62 and 63. It is the use of this sampling detector 60 which permits limiting in the preceding clipping amplifier stage without the loss of gain to the error signal. This diode switch is triggered through the inductive coupling 64 by pulses two microseconds in length as the in-phase error signal passes through 90° and 270° as shown by waveform F. The gating pulses are derived from a blocking oscillator or gate pulse generator 70 whose input is a ninety degree reference voltage as shown at the terminal 11 by waveform G. Thus, the sampling detector rejects quadrature voltage component by sampling and clamping the error signal voltage at 90° and 270° where the quadrature voltage component is zero. The detector output taken off cathode follower 65 is a square wave of amplitude equal to the in-phase error signal is shown by waveform H. This sampling technique permits quadrature clipping ahead of the detector without reducing the amplification of the in-phase error and thus reduces the linear requirements of the circuit.

The envelope of the error signal suffers an increasing phase lag with increasing frequency as it is transmitted around the feedback loop. In an uncompensated loop, most of the phase shift is incurred between the motor input and the tachometer output. The phase lag is accompanied by an attenuation of the envelope, and the servo system must be designed so that the magnitude of the loop gain is less than unity at the critical frequency where 180° phase lag is realized, or else a self-sustained oscillation will occur. The servo system is improved by placing a compensation circuit in the loop which will increase the gain below the critical frequency without materially affecting the gain or phase shift at the critical frequency.

To provide loop compensation in an A.C. servo system using sampling detector 60, the output of the detector as noted by waveform H is operated on by an A.C. compensation network. The compensation network operates on the input voltage, waveform H, to resistor 87 by synchronously switching between two passive networks, that is, RC combinations 83, 85, and 84, 86, in a feedback path of amplifier 81 by the single pole double throw triode switch 82. Since the switch is in synchronism with the input voltage by virtue of being driven by the 90° reference voltage at terminal 11, one feedback network is connected when the input is of a given polarity while the other feedback network is connected when the input is of opposite polarity. Thus each of the RC combinations operates alternately on the envelope of the input to yield an envelope compensated square wave output. The biased diodes 88 and 89 are placed across the uncommon terminals of the condensers 85 and 86 to improve the recovery of the servo motor from severe commands to which the motor is unable to respond because of torque saturation, that is, flux saturation. If it were not for the biased diodes 88 and 89, the condensers 85 and 86 would charge to unduly high voltages during times of excessive commands because the motor is incapable of removing the error quickly enough. This condition would lead to an unduly long overshoot of the servo motor output to obtain an error of opposite sign required to discharge the condensers 85 and 86 back to their normal levels. For this reason the condensers are allowed by the biased diodes 88 and 89 to charge only to a voltage which results in torque saturation of the motor, further charging being futile in producing more torque and being undesirable as causing undue overshoot. The proper bias for the diodes is the minimum peak-to-peak voltage of the square wave output of the compensation network which will cause torque saturation of the motor. The output of the compensation network 80 as shown by waveform I is fed to the output amplifier which feeds the control winding of the induction motor 1.

In a system which was built using the inventive amplifier, an increase in loop gain from about 2000 to 6000 was made possible by the use of the sampling detector and the A.C. compensation network.

It is therefore apparent in the light of the foregoing description that the invention presents a solution for permitting quadrature clipping without reducing or clipping the amplification of the in-phase error signal and providing high gain amplification in the presence of this error signal.

Obviously many modifications and variations of the present invention are possible in the light of the above teachings. It is therefore to be understood that within the scope of the appended claims the invention may be practiced otherwise than as specifically described.

What is claimed is:

1. In an alternating current servo system, the combination of an output shaft, a servo motor, a tachometer coupled to said output shaft, a feedback amplifier, a third harmonic trap and low-pass filter, a clipping amplifier comprising two biased diodes in the feedback circuit of this amplifier so that a large quadrature voltage signal in the input signal being fed from said filter is limited and reduced without affecting any small in-phase voltage signal, a sampling detector comprising a diode switch, condenser and a cathode follower so that said condenser is charged to the voltage of the in-phase signal through said diode switch, a gate pulse generator inductively coupled to said sampling detector so that the output pulses of said generator trigger said cathode follower when the in-phase signal passes through 90° and 270° at which time the quadrature voltage component is zero and so that a square wave of amplitude equal to the in-phase voltage signal is obtained at the output of said cathode follower, an alternating current compensating network comprising a high gain amplifier, two passive networks in the feedback path of said high gain amplifier and a single pole double throw triode switch connected between the output of said high gain amplifier and said two passive networks so that the output of said cathode follower of said sampling detector is synchronously switched between the two passive networks which respect to a reference voltage by said triode switch, and an output amplifier which in turn feeds the amplifier square wave to the control winding of said servo motor to correct the error indicated by the tachometer.

2. In an alternating current servo system, the combination of an output shaft, a two-phase induction motor driving said output shaft, an induction tachometer coupled to said output shaft, a feedback amplifier, a feedback signal of said tachometer combining with a command signal and amplified in said feedback amplifier to form a third signal having both a small in-phase component proportional to the error between the feedback signal and the command signal, and a large quadrature component not a function of the error, a third harmonic trap and low-pass filter, said third signal fed to said trap to delete the third harmonic from said third signal, a clipping amplifier comprising a first pair of biased diodes in the feedback circuit of said amplifier so that a large quadrature voltage signal in the input signal being fed from said filter is limited and reduced without affecting any small in-phase voltage signal thus reducing requirements of linearity in the system, a sampling detector comprising a diode switch, condenser and cathode follower connected across said condenser so that said condenser through said diode switch is charged to the voltage of the in-phase signal being fed from said clipping amplifier, a gate pulse generator inductively coupled to said sampling detector so that the output pulses of said generator trigger said cathode follower at the time the in-phase signal passes through 90° and 270° at which time the quadrature voltage component is zero, and so that a square wave of amplitude equal to the in-phase voltage signal is obtained at the output of said cathode follower, and an alternating current compensating network comprising a high gain amplifier, two passive networks in the feedback path of said high gain amplifier and a single pole double throw triode switch connected between the output of said high gain amplifier and said two passive networks so that the output of said cathode follower of said sampling detector is synchronously switched between the two passive networks in respect to a reference voltage by said triode switch to yield an envelope compensated square wave output, and an output amplifier which in turn feeds the amplified square wave output to the control winding of said servo motor to correct the error indicated by the tachometer.

3. In an alternating current servo system, a clipping amplifier comprising two biased diodes in the feedback circuit of said amplifier so that a large quadrature voltage signal in the input circuit is limited and reduced without affecting any small in-phase voltage signal, a sampling detector comprising a diode switch, a condenser connected to the output of said diode switch, and a cathode follower connected across said condenser so that said condenser is charged to the voltage of the inphase signal through said diode switch, a gate pulse generator inductively coupled to said sampling detector so that the output pulses of said generator trigger said cathode follower at the time the in-phase signal passes through 90° and 270° at which time the quadrature voltage component is zero and so that a square wave of amplitude equal to the in-phase voltage signal is obtained at the output of said cathode follower, an alternating current compensation network comprising a high gain amplifier, two passive networks in the feedback path of said high gain amplifier and a single pole double throw triode switch so that the output of said cathode follower of said sampling detector is synchronously switched between the two passive networks in respect to a reference voltage through said triode switch to yield an envelope compensated square wave output.

4. In an alternating current servo system, the combination of a sampling detector and gate pulse generator, said sampling detector detecting a small in-phase voltage signal in the presence of a large quadrature voltage signal, said detector comprising a diode switch, a condenser connected to the output of said diode switch and a cathode follower connected across said condenser so that said condenser is charged to the voltage of the inphase signal through said diode switch, said gate pulse generator being inductively coupled to said sampling detector so that the output pulses of said generator trigger said cathode follower when the in-phase signal passes through 90° and 270° at which time the quadrature voltage component is zero and so that a square wave signal of amplitude equal to the in-phase voltage signal is obtained at the output of said cathode follower.

5. In an alternating current servo system, a detector for sampling a small in-phase voltage signal in the presence of a large quadrature voltage signal, said detector comprising a diode switch having two biased diodes, an inductance element having a common input point, the ends of the inductance element being connected to the respective biased diodes, a condenser connected to the output of said diode switch and a cathode follower having its grid and cathode elements connected across said condenser so that said condenser is charged to the voltage of the in-phase signal through said diode switch thereby sampling and clamping the in-phase signal voltage at 90° and 270° at which time the quadrature voltage signal is zero and obtaining from the output of said cathode follower a square wave signal of amplitude equal to the in-phase voltage signal.

6. In an alternating current servo system a clipping amplifier having an input resistor, a feedback resistor, and two biased diodes shunted across said feedback resistor so that a small in-phase signal is amplified linearly and a large quadrature signal is limited and reduced without overloading said amplifier, a sampling detector connected to said clipping amplifier, said sampling detector comprising a diode switch, a condenser connected to the output of said diode switch, and a cathode follower connected across said condenser so that said condenser is charged to the voltage of the in-phase signal through said diode switch, a gate pulse generator inductively coupled to said sampling detector so that the output pulses of said generator trigger said cathode follower at the time the in-phase signal passes through 90° and 270° at which time the quadrature voltage component is zero and so that a square wave of amplitude equal to the in-phase voltage signal is obtained at the output of said cathode follower, an alternating current compensation network connected to said sampling detector, said alternating current compensation network comprising a high gain amplifier, two passive RC networks in the feedback path of said high gain amplifier, and a single pole double throw triode switch so that the output of said cathode follower of said sampling detector is synchronously switched between the two passive networks in respect to a reference voltage through said triode switch to yield an envelope compensated square wave output.

7. In an alternating current servo system, a detector for sampling a small in-phase voltage signal in the presence of a large quadrature voltage signal, said detector comprising a diode switch having a pair of biased diodes, an inductance element having a common input point, the ends of the inductance element being connected to the respective biased diodes, a condenser connected to the output of said diode switch, and a cathode follower having its grid and cathode elements connected across said condenser so that said condenser is charged to the voltage of the in-phase signal through said diode switch thereby sampling the in-phase signal voltage at 90° and 270° at which time the quadrature voltage signal is zero and obtaining from the output of said cathode follower a square wave signal of amplitude equal to the in-phase voltage signal, and an alternating current compensation network connected to said sampling detector, said alternating current compensation network comprising a high gain amplifier, two passive RC networks in the feedback path of said high gain amplifier, and a single pole double throw triode switch so that the output of said cathode follower of said sampling detector is synchronously switched between the two passive networks in respect to a reference voltage through said triode switch to yield an envelope compensated square wave output.

8. In an alternating current servo system, an alternating current compensation network comprising a high gain amplifier, two passive RC networks in the feedback path of said high gain amplifier, and a single pole double throw triode switch connected between the output of said high gain amplifier and said two passive networks and being driven by a reference voltage so that the two passive networks operate alternately in the feedback path in synchronism with a square wave input voltage to yield an envelope compensated square wave output.

9. In an alternating current servo system, an alternating current compensation network and a two phase induction servo motor, said servo motor connected to said alternating current compensation network, said compensation network comprising a high gain amplifier, two passive networks in the feedback path of said high gain amplifier, a condenser in each of said passive networks and a single pole double throw triode switch connected between the output of said high gain amplifier and said two passive networks and being driven by a reference voltage so that the two passive networks operate alternately in the feedback path in synchronism with a square wave input to yield an envelope compensated square wave output, and a pair of biased diodes connected across the uncommon terminals of the condensers, said biased diodes allowing said condensers to charge only to a voltage which results in torque saturation of the motor preventing any undue overshooting of said motor.

10. In an alternating current servo system, the combination of an output shaft, a two-phase induction motor driving said output shaft, an induction tachometer coupled to said output shaft, a feedback amplifier, a feedback signal of said tachometer combining with a command signal and amplified in said feedback amplifier to form a third signal having both a small in-phase component proportional to the error between the feedback signal and the command signal, and a large quadrature component not a function of the error, a third harmonic trap and low-pass filter, said third signal fed to said trap to delete the third harmonic from said third signal, a clipping amplifier comprising a first pair of biased diodes in the feedback circuit of said amplifier so that a large quadrature voltage signal in the input signal being fed from said filter is limited and reduced without affecting any small in-phase voltage signal thus reducing requirements of linearity in the system, a sampling detector comprising a diode switch, condenser and cathode follower connected across said condenser so that said condenser through said diode switch is charged to the voltage of the in-phase signal being fed from said clipping amplifier, a gate pulse generator inductively coupled to said sampling detector so that the output pulses of said generator trigger said cathode follower at the time the in-phase signal passes through 90° and 270° at which time the quadrature voltage component is zero, and so that a square wave of amplitude equal to the in-phase voltage signal is obtained at the output of said cathode follower, and an alternating current compensating network comprising a high gain amplifier, a pair of condensers, two passive networks in the feedback path of said high gain amplifier, one of said last-mentioned condensers in each of said passive networks, and a second pair of biased diodes connected across the uncommon terminals of said last-mentioned condensers, said biased diodes allowing said last-mentioned condensers to charge only to a voltage which results in torque saturation of the motor, and a single pole double throw triode switch connected between the output of said high gain amplifier and said two passive networks so that the output of said cathode follower of said sampling detector is synchronously switched between the two passive networks in respect to a reference voltage by said triode switch, and an output amplifier which in turn feeds the amplified square wave output to the control winding of said servo motor to correct the error indicated by the tachometer.

References Cited in the file of this patent

UNITED STATES PATENTS

| | | |
|---|---|---|
| 2,115,086 | Riggs | Apr. 26, 1938 |
| 2,531,600 | Barney et al. | Nov. 28, 1950 |
| 2,554,905 | Hawkins et al. | May 29, 1951 |
| 2,655,597 | Scoles | Oct. 13, 1953 |
| 2,698,914 | Tryon | Jan. 4, 1955 |
| 2,712,082 | Yeasting | June 28, 1955 |
| 2,724,969 | Blosser | Nov. 29, 1955 |
| 2,729,772 | Perkins | Jan. 3, 1956 |
| 2,769,126 | Pellechia | Oct. 30, 1956 |